March 28, 1939.　　　F. HAWKINS　　　2,152,048
POWER JACK
Filed May 4, 1937　　　2 Sheets-Sheet 1
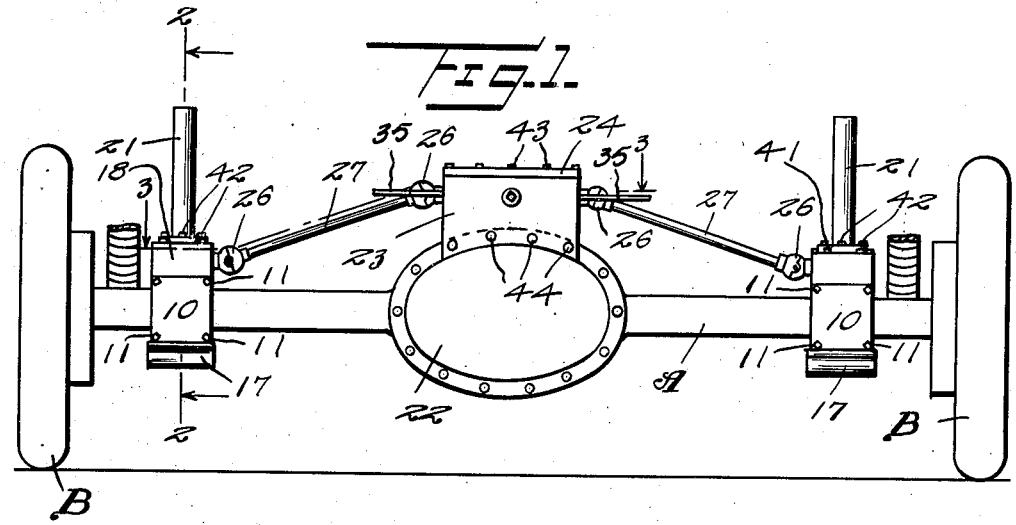
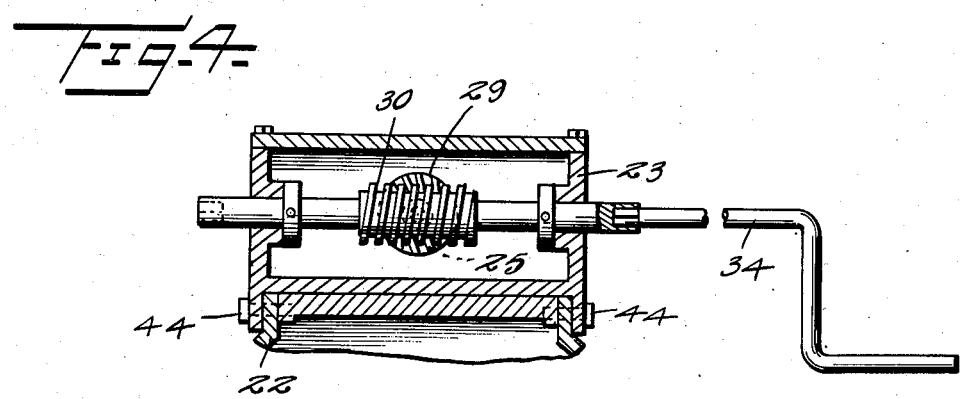
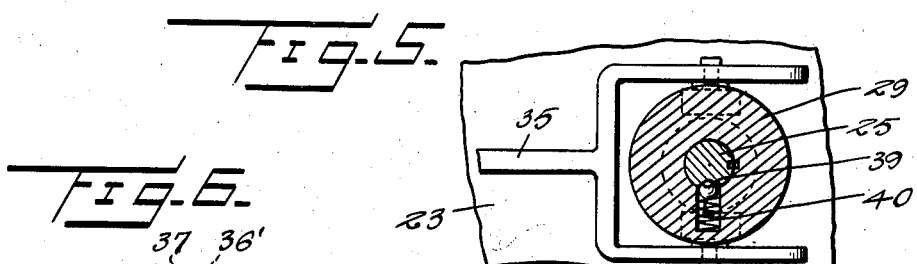
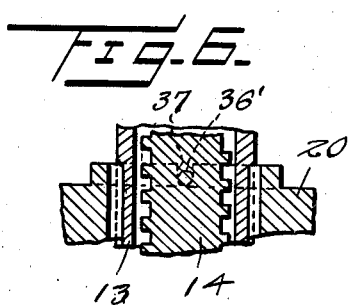
Fred Hawkins
INVENTOR
BY *Victor J. Evans & Co.*
ATTORNEY

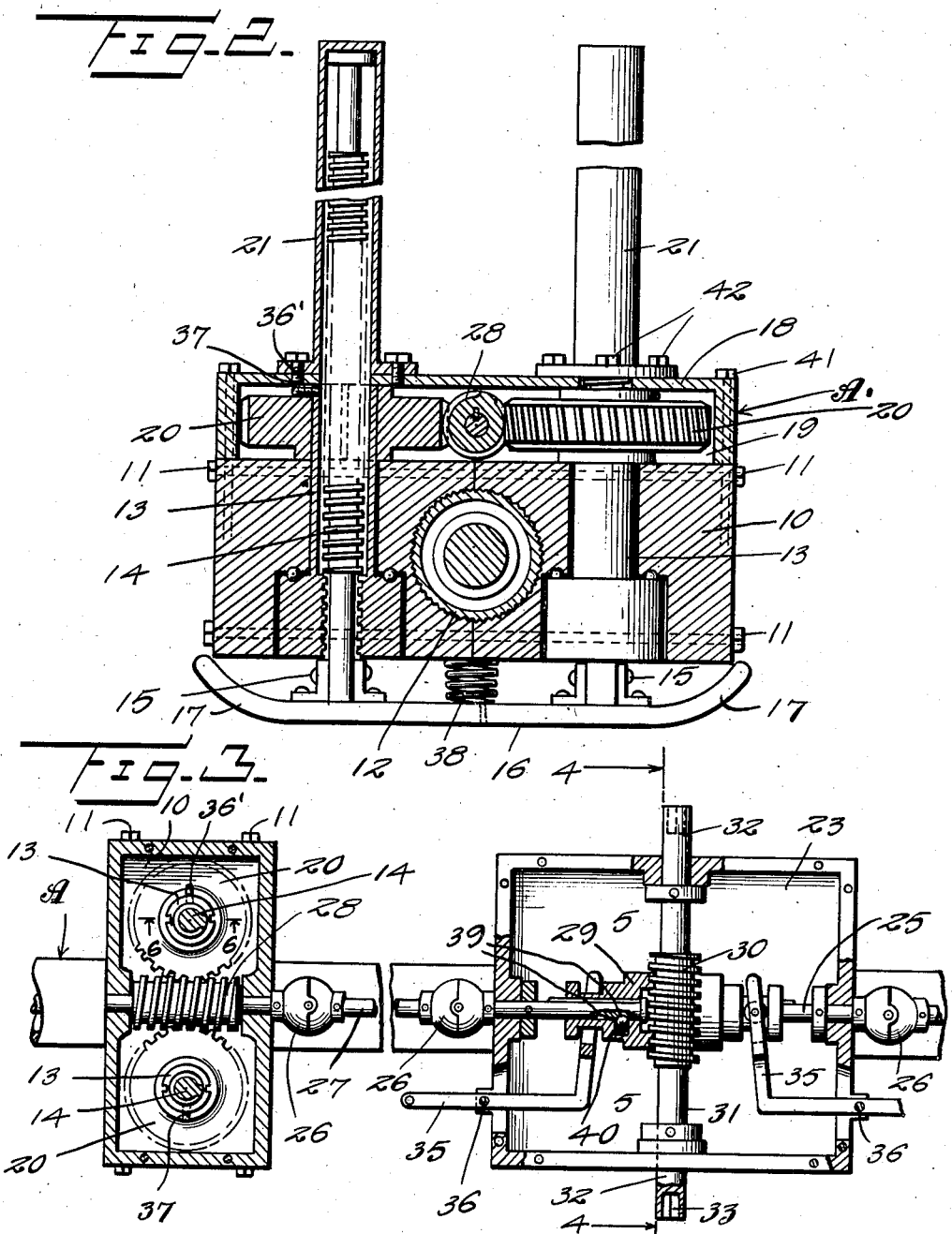

Patented Mar. 28, 1939

2,152,048

UNITED STATES PATENT OFFICE 2,152,048

POWER JACK

Fred Hawkins, Gilmer, Tex.

Application May 4, 1937, Serial No. 140,748

2 Claims. (Cl. 254—86)

The invention relates to a power jack and more especially to a built-in power jack for motor vehicles.

The primary object of the invention is the provision of a jack of this character, wherein the same is built with the rear end of a motor vehicle and is susceptible of being hand operated or driven from the motor of the vehicle for the raising of the two rear wheels or these singly when it is required to change the tires of both wheels or the tire of a single wheel particularly when the vehicle is of the heavy duty type and will assure the raising and lowering operation with dispatch.

Another object of the invention is the provision of a jack of this character, wherein the same when not in use assures maximum clearance beneath the vehicle between the wheels thereof and will enable the lifting of the vehicle to a high elevation whether loaded or unloaded and is readily and easily accessible for the working of the same.

A further object of the invention is the provision of a jack of this character, which is simple in construction, thoroughly reliable and effective in operation, strong, durable, easy in the working thereof, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a rear elevation of the rear end of a motor vehicle showing the jack constructed in accordance with the invention built therein.

Figure 2 is a fragmentary sectional view taken on the line 2—2 of Figure 1 looking in the direction of the arrows.

Figure 3 is a sectional view on the line 3—3 of Figure 1 looking in the direction of the arrows.

Figure 4 is a sectional view on the line 4—4 of Figure 3 looking in the direction of the arrows.

Figure 5 is a fragmentary detail vertical transverse sectional view taken on the line 5—5 of Figure 3 looking in the direction of the arrows.

Figure 6 is a fragmentary sectional view on the line 6—6 of Figure 3 looking in the direction of the arrows.

Similar reference characters indicate corresponding parts throughout the several views in the drawings.

Referring to the drawings in detail, A designates generally the rear housing of a motor vehicle and B the drive wheels for such vehicle while adapted to be built with this housing A is the jack constituting the present invention and hereinafter fully described.

The jack comprises a two-part or sectional block 10 adapted to be fitted exteriorly of the housing A at one side of the center portion thereof, the parts or sections of this block carry fasteners 11 which make secure the said block upon the housing, being preferable to have the contacting areas of both the housing A and the block with each other roughened or serrated at 12 to eliminate any possibility of the turning of the block when upon the housing when secured by the fasteners 11 thereto. Rotatably fitted in the block 10 on opposite sides of the housing is the pair of internally threaded feed sleeves 13 which are rotatably arranged and engage with jack stems or screws 14 so that by the turning or rotating of the sleeves 13 the stems or screws 14 will be raised or lowered while connected at 15 to the lower ends of this pair of stems or screws 14 is a foot 16 having the upwardly curved ends 17, the foot 16 being disposed in a longitudinal direction with respect to the motor vehicle.

Fitted with the block 10 at the upper side thereof is a casing 18 forming a gear space 19 for worm gears 20 which are splined or keyed exteriorly to the sleeves 13 for rotation thereof.

Fitted upon the casing 18 are coverings or caps 21 for the stems or screws 14 and these coverings or caps 21 are of a height to project from the casing 18 for allowing full upward movement of said stems or screws 14 for the raising of the foot 16 the required height to give maximum clearance beneath the motor vehicle when the jack is in normal or inactive position.

Intermediate of the housing A and fastened to the differential section 22 thereof at its top is a gear casing 23 having a removable top or cover plate 24 and journaled within this casing 23 are opposed laterally directed stud shafts 25 which through universal joint connections 26 and shafting 27, respectively, operate worm screws 28 suitably journaled in the casing 18 and each meshes with the worm gears 20. Slidably splined on each stud shaft 25 is a worm gear 29 for meshing engagement with a worm screw 30 on an operating shaft 31 suitably journaled in the casing 23 to be located between the stud shafts 25 and disposed at right angles thereto, this shaft 31 being at its opposite ends 32 exteriorly of the casing 23. These ends 32 of the drive shaft 31 are provided with sockets 33, the socket in the rearmost end of the said shaft being adapted to accommodate a hand crank 34 so that said shaft 31 can be manually rotated while the socket in the foremost end 32 is adapted for a connection with the motor vehicle for the mechanical driving of the shaft 31 directly from the said motor should it be required.

The slide gears 29, being two in number, one on each side of the worm screw 30, are operated upon by throw levers 35 pivoted at 36 and these levers can be operated manually so that the jacks at both sides of the motor vehicle can be operated together or in single order.

Each sleeve 13 to which is splined the gear 20 has fitted therein a holding screw 36 accommodated within a socket 37 in the said gear 20 and in this manner the sleeve 13 is prevented from dropping out of the block 10 when fitted therein.

The foot 16 carries a coiled bumper spring 38 which has contact with the block 10 at the under side thereof when the jack is in normal or inactive position.

It is, of course, understood that a pair of jacks is employed, these being located at opposite sides of the center section 22 of the housing A close to the wheels B and each jack includes the pair of feed stems or screws 14 although it is possible that the jack may be possessed of but a single stem or screw 14, this being contemplated within the scope of the invention.

Each stud shaft 25 is formed with spaced keeper notches 39 for accommodating a ball spring tensioned latch 40 carried in each gear 29 so that the latter can be locked in reversely thrown positions, the one position when meshing with the screw 30 and the other position when out of mesh therewith.

The casing 18 is separably fastened to the block 10 by fasteners 41 while the caps or coverings 21 are fastened in place by fasteners 42. The top cover plate 24 is separably secured in place by fasteners 43, the gear casing 23 being secured fixedly by fasteners 44 fitting the housing A of the motor vehicle.

What is claimed is:

1. An automobile power jack comprising a block accommodating a rear housing of said automobile, said block having shouldered sockets opening therethrough at the upper and lower sides and disposed at opposite sides of the housing, internally threaded sleeves correspondingly shaped to and fitting within said sockets with the upper ends of the sleeves extended above the block, jack screws engaged in the said sleeve and with the internal threads thereof, a covering at the top of the block and forming a gear closure, worm gears fixed to the upper ends of said sleeves, caps carried by said covering and accommodating the said jack screws when traveling in one direction, a foot disposed longitudinally with respect to the automobile and fixed to the said jack screws at their lower ends for bridging disposition of the said housing directly beneath the said block, and a worm screw between said gears and common to both of the same for meshing engagement therewith.

2. An automobile power jack comprising a block accommodating a rear housing of said automobile, said block having shouldered sockets opening therethrough at the upper and lower sides and disposed at opposite sides of the housing, internally threaded sleeves correspondingly shaped to and fitting within said sockets with the upper ends of the sleeves extended above the block, jack screws engaged in the said sleeve and with the internal threads thereof, a covering at the top of the block and forming a gear closure, worm gears fixed to the upper ends of said sleeves, caps carried by said covering and accommodating the said jack screws when traveling in one direction, a foot disposed longitudinally with respect to the automobile and fixed to the said jack screws at their lower ends for bridging disposition of the said housing directly beneath the said block, a worm screw between said gears and common to both of the same for meshing engagement therewith, and a resilient buffer interposed between the block and said foot and medially arranged with relation to the housing.

FRED HAWKINS.